May 21, 1963 H. KARLBY ET AL 3,090,878
HIGH TEMPERATURE ELECTRICAL MACHINES
Filed Sept. 26, 1955 4 Sheets-Sheet 4
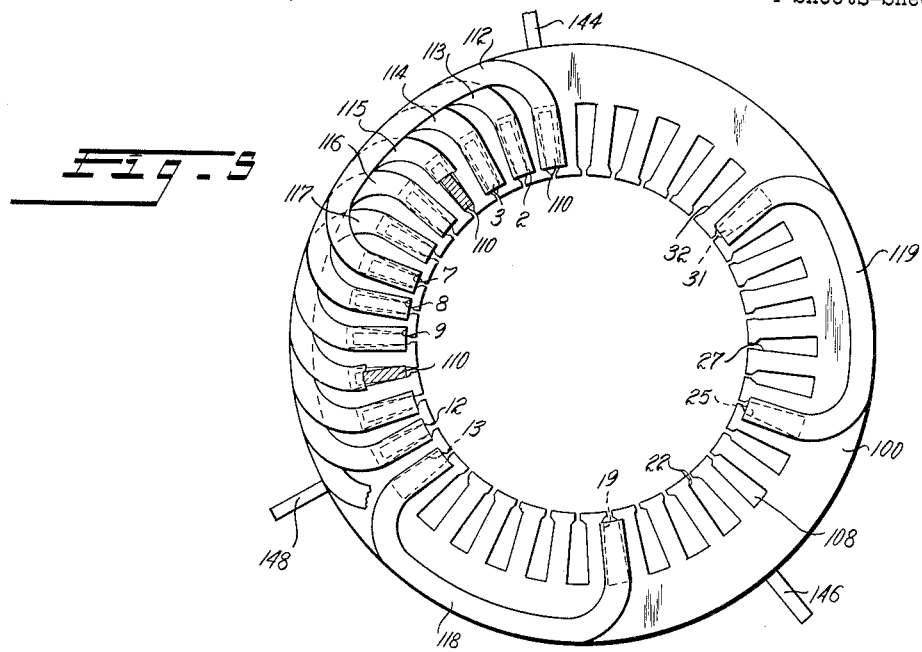
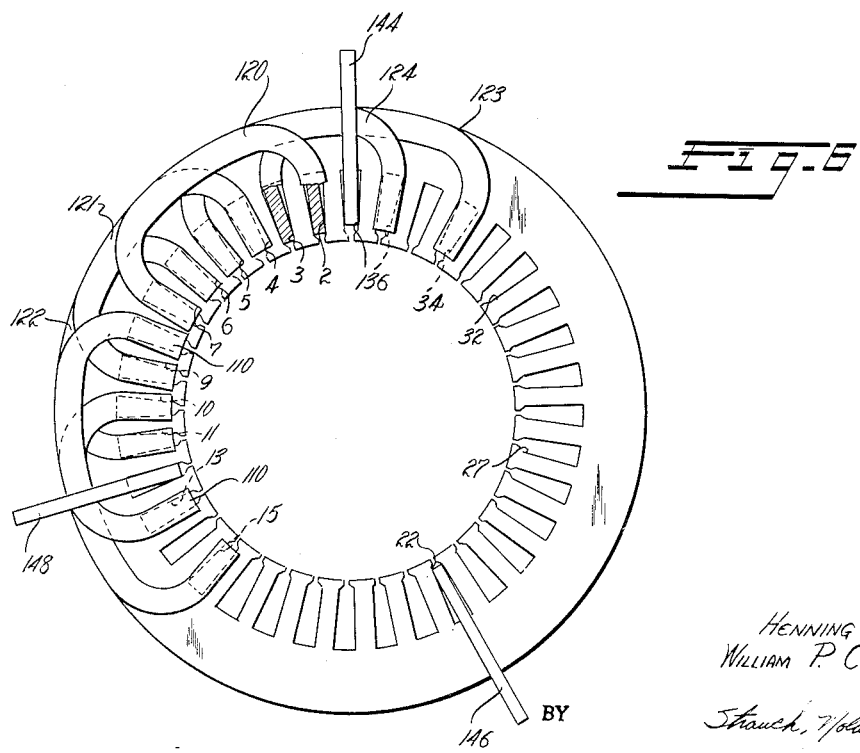
INVENTOR
HENNING KARLBY
WILLIAM P. CAYWOOD, Jr.
BY
ATTORNEY

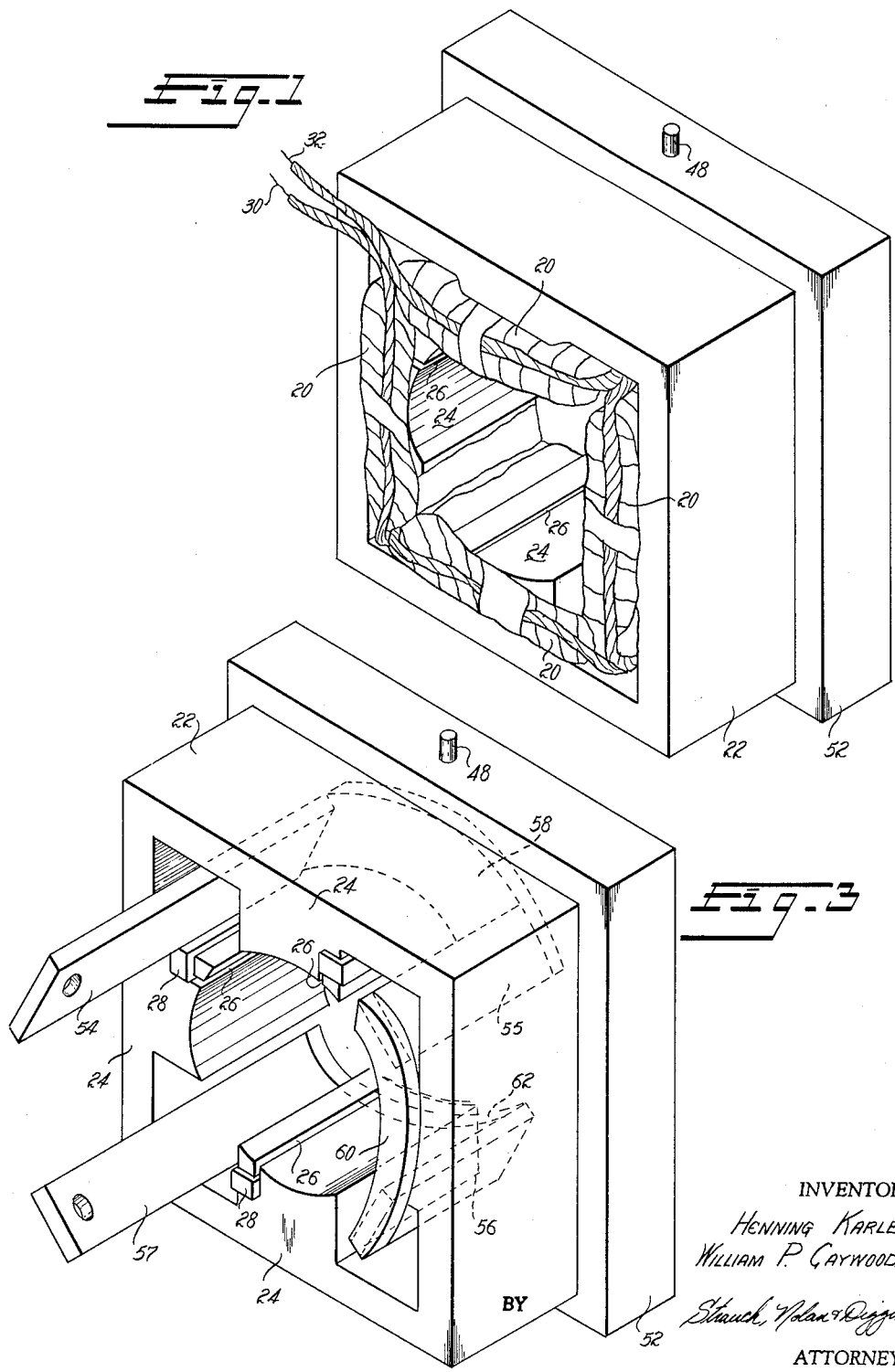

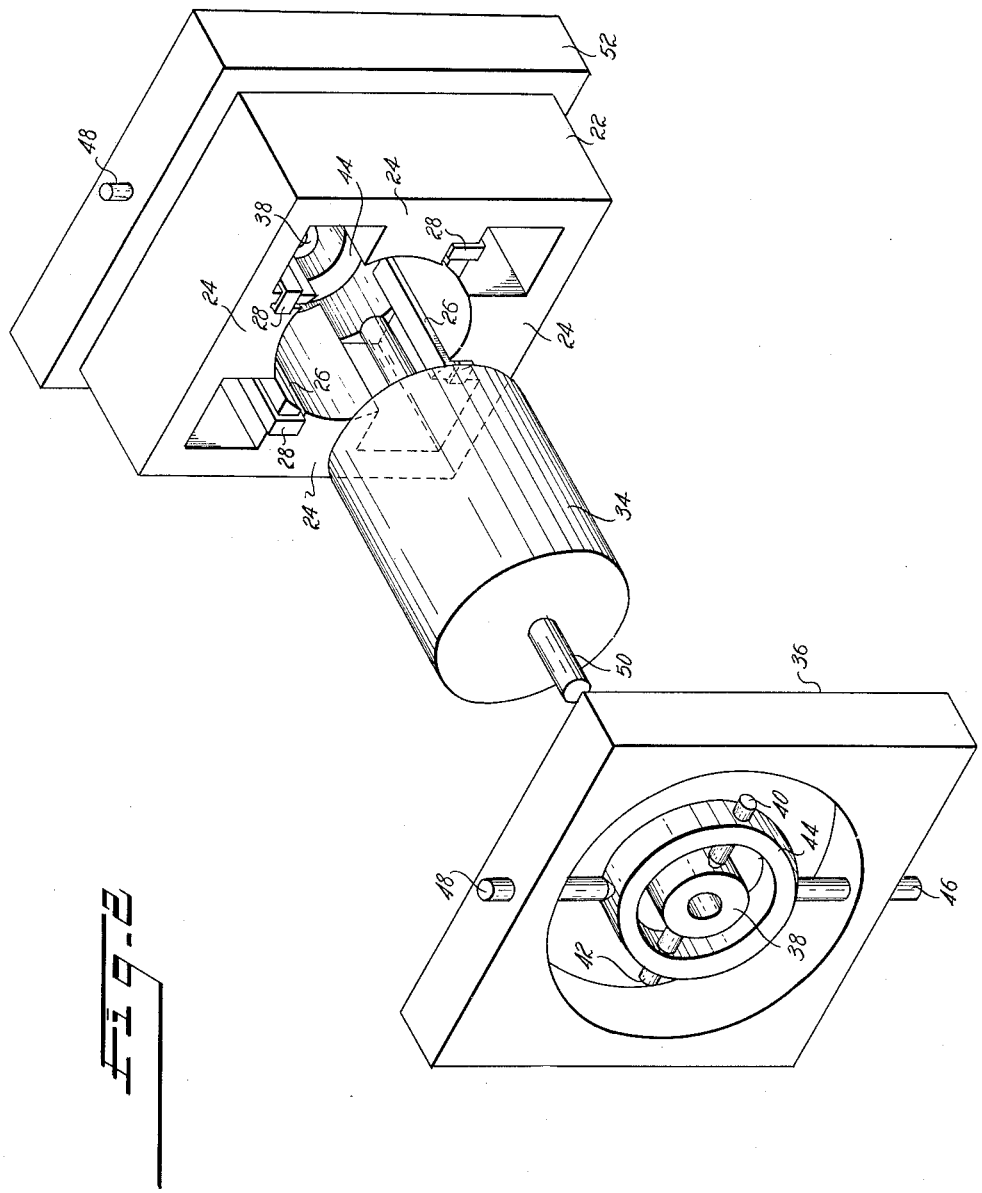

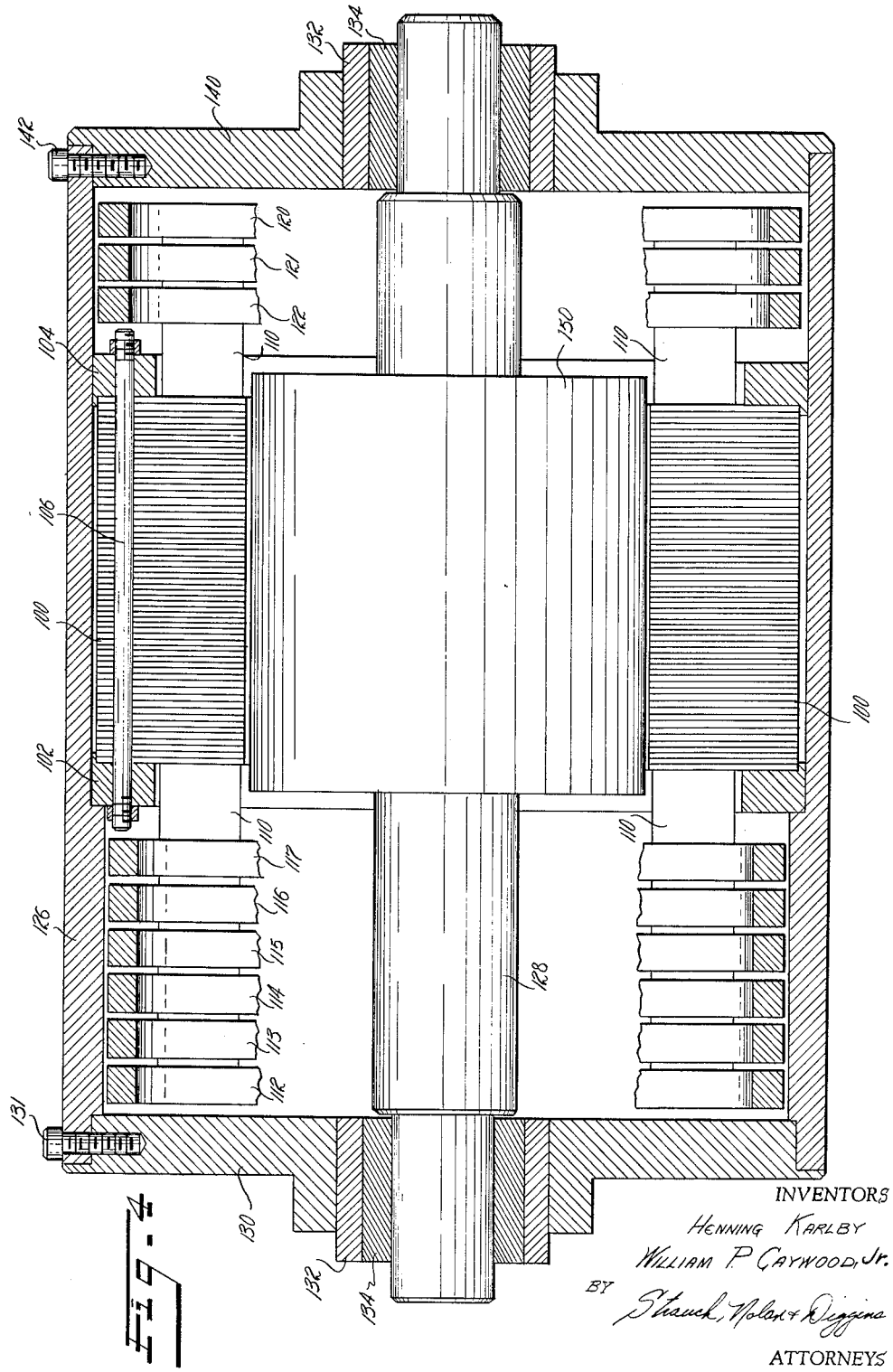

United States Patent Office 3,090,878
Patented May 21, 1963

3,090,878
HIGH TEMPERATURE ELECTRICAL MACHINES
Henning Karlby, Pittsburgh, Pa., and William P. Caywood, Jr., Export, Pa. (both % Rockwell Mfg. Co., 400 N. Lexington Ave., Pittsburgh 8, Pa.)
Filed Sept. 26, 1955, Ser. No. 536,352
4 Claims. (Cl. 310—166)

This invention relates to electrical dynamo machines, and more particularly to electrical machines capable of operating with internal temperatures up to about 1400° to 1500° F.

In electrical machines the primary limitation on the amount of power that a particular sized machine is able to generate in the case of generators or produce in the form of shaft rotation in the case of motors, is determined by the maximum temperature at which the machine will satisfactorily operate. The losses in an electrical machine, primarily due to the current flow through the resistance of the conducting material and to the hysteresis of the magnetizable material, are evidenced as heat and increase in total as the power supplied by the machine increases.

Part of this heat is dissipated by the machine and the remainder, being absorbed, causes the temperature of the machine to increase. The temperature in the machine becomes constant during operation when the heat absorption becomes zero, that is, when the temperature is reached where the rate at which heat generated in the machine is equal to the rate at which heat is dissipated by the machine. The rate at which heat is dissipated by a given machine depends in general upon the difference between the temperature of the machine and that of its environment.

The material in a machine which dictates the highest temperature at which the machine will satisfactorily operate is generally recognized as the insulation of the windings. Ordinary materials used as insulation over the past several years include mica paste, enamel, varnished cloth, paper, cotton, various gums and varnishes all of which become dry and brittle with continued exposure to temperatures in the neighborhood of 220° F. Upon becoming dry and brittle, the electrical insulation properties decrease and the material itself breaks up and falls out of position due to vibration in the machine. Thus the ambient temperature of the environment in which the machine is to be operated and the volume of the machine must be so related that the internal temperature in the machine does not exceed a safe value such as discussed above.

The nominal power rating of a motor is based on an ambient temperature of 40° C. (104° F.). As the ambient temperature increases, the amount of power that can be delivered from the motor without exceeding a safe internal temperature decreases. Therefore with conventional materials, it is impossible to provide an electrical machine which can operate in an environment whose ambient temperature is above 220° F.

Several ways have been devised for increasing the heat dissipation rate from electrical machines, some of the more common consisting of adding fan blades to the rotor element and utilizing cooling vanes or coils having a coolant circulating therethrough on the motor casing. However the real solution in providing an electrical machine which can withstand higher internal temperatures has been considered by those skilled in this art to reside in providing improved insulation material which can withstand higher temperatures.

One such material recently developed is an enamel known as Alkanex which is described in the General Electric Review, May 1955, pages 3, 6, 7, as raising the limiting operating temperature from 220° F. to 300° F. for motors and other types of electrical equipment wound with enamel-insulated magnet wire. Due to this higher operating temperature limit, the power rating of a given sized motor can be increased as much as 25 percent.

A dynamo for use in the instrumentation field as distinguished from the power field described in the publication, Electrical Engineering, July 1955, issue on page 8A is a tachometer generator meeting modern jet engine requirements by being capable of reliable and accurate engine speed indication at a temperature of 450° F. The special design features to give this high temperature performance are heat-treated magneto-type ball bearings, Teflon-insulated magnet wire, and wide temperature-range greases.

Present day technology has an urgent need for electrical machines which can operate at considerably higher temperatures in many fields and particularly in the nuclear energy field. In atomic reactors there is a problem of manipulating the physical position of control rods and valves through an air-tight seal which is effective to prevent radiation leakage. Present practice requires the use of specially designed seals around movable shafts whereas with motors which could operate in the range of the internal temperatures in the reactor, the entire motor could be located inside the radiation shield with only the electrical leads sealed against radiation leakage.

Another very important task for electric motors is for pumping the reactor coolants. A special report tabulating the various pumps that are available for this purpose is published in Nucleonics, vol. 13, No. 7, July 1955, pp. 78–80, published by the McGraw-Hill Publishing Co. of New York. All of the pumps listed in this publication are stated as having special precautions to prevent leakage.

The most popular type of pump as listed in the above publication and chosen after a careful consideration of all available known arrangements as evidenced by the paper "Pumping in Hermetically Sealed Systems," by Cametti, Paper No. 54-A-119, presented to the American Society of Mechanical Engineers, December 3, 1954, is a "canned" rotor motor. This paper discussed the results of a feasibility study made to evaluate the possible methods for circulating a liquid similar to water at an ambient pressure of 2000 p.s.i. and operating temperature of 450° F.

Various types of drive units discussed in this paper were classified as either falling into hermetic or non-hermetic units. Non-hermetic drives are those operating through some sort of shaft seal such as a conventional packing seal or a leak-off type normally known as a pressure break down seal. Most packing seals depend on the use of an elastic material as one element which can be forced into adjustment with the mating element, or by high precision at the mating surfaces of the seal faces. Such an arrangement usually presumes a given amount of leakage.

Hermetic drives were classified in this paper as "canned" electric motors, flooded electric motors, hermetic pump and drive with sealed interface, and hermetic turbine drives. The flooded electric motor such for example as shown in U.S. Patent No. 2,629,076, and British Patent 10,655/1912 permits the fluid being pumped in the system to completely envelop both the motor rotor and stator windings. According to the proposed plan in this paper, the temperature of the water which is in intimate contact with the motor parts would be at a much lower temperature than the water being pumped and in addition there would be contamination resulting from the direct contact of the water with the motor insulation.

The solution reported and adopted by most motor manufacturers as shown in the above identified Nucleonics article is a motor having a metallic can or diaphragm between the rotor cavity and stator bore and known as a "canned" motor.

In conjunction with the "canned" motor and pump, a labyrinth-type shaft seal is located between the pump and the motor which for practical purposes is the only passage or communication between the fluid being pumped and the fluid contained within the motor. Normally any fluid exchange across this seal is one resulting from diffusion or small pressure fluctuations which may occur during operation. The temperature of the water enclosed within the motor immediately behind the seal is then held to a maximum of 200° F. with a large temperature gradient occurring across the seal.

Because of the large amount of heat generated within the pump and motor unit which included the electrical, hydraulic, and thermal losses due to radiation and convection resulting from the inherent close contact between the motor drive and the high temperature of the fluid being pumped, it was impractical to rely on conventional means of heat dissipation such as external radiation and convection as normally used in motor design. Thus a low-pressure fresh-water heat-exchange system was built integral with the motor to remove the excess heat and to keep the water temperature in the air gap surrounding the bearing at approximately 150° F.

One further problem with a "canned" motor which adds to the overall cost is that since the stator can is the only barrier containing the system pressure, it was considered necessary to have a back-up protection in the event that the can ruptures as a result of some extreme unforeseen conditions. Adequate safety precautions require the outside motor shell and motor terminals to be designed to withstand the full system pressure.

The two most critical components in a "canned" motor unit are recognized as being the bearings and the electrical windings in the paper entitled "Design and Operation of the Small Canned Motor Pumps" by A. J. Mei, presented at the American Society of Mechanical Engineers, December 3, 1954, and identified as Paper No. 54-A-120. It is therein acknowledged that the cooling system in the "canned" motors is extremely critical and any failure of the system with power applied to the motor results in almost certain electrical burn-out of the windings.

According to this present invention, many of the above described practices are unnecessary in that it has been found that electrical machines can be constructed which will operate in environments having temperatures up to 1200° F. without requiring external cooling means. The internal temperature of these machines can be allowed to be as high as the Curie point of the magnetization material which with iron is approximately 1500° F.

The machines of the present invention are characterized by their intentional current path having a higher intrinsic admittance than any parasitic path through the machine. Structurally, the high admittance of the intentional current path is obtained by the use of large cross-section members of good conducting material making only one or a few turns around the magnetic material without the use of organic or other types of insulation which are destroyed by high temperatures.

The power or torque output per unit volume or mass of such an electric machine has been increased by as much as 40 times without reaching temperatures which destroy any of the materials and prevent operation of the machine. Since the torque per pound ratio is greatly increased, the inertia to torque ratio is decreased by a corresponding amount thus providing a motor having greatly improved properties for operation at high rates of acceleration, which in the past has required hydraulic motors.

It accordingly is a major object of this invention to provide a dynamo-electric machine capable of operating at temperatures up to the Curie point of the magnetization material or the melting point of the conducting material whichever is lower.

It is another object of this invention to provide a novel dynamo-electric machine having no insulation or other materials the destruction of which would prevent operation of the machine up to temperatures in the range of 1200° to 1500° F.

A further object of this invention is to provide a novel electrical machine having single turn windings which are completely uninsulated (except for possible oxide coatings which may be incidentally formed during operation) and supplied with power in the form of a high current at low voltage.

Another major object of this invention is to provide a novel dynamo-electric machine capable of supplying as much as forty times as much output per unit volume or mass as conventional machines.

Still another object of this invention is to provide a novel dynamo-electric machine which can be operated with flux densities at or above the saturation point of the magnetizable material thereby providing increased power output for a given sized machine.

A still further object of this invention is to provide a novel machine in which high current densities and temperatures in the conducting material will not cause abrupt changes in the admittance of the electrical circuit which cause failure of operation of the machine.

These and other objects of this invention will more fully become apparent from the appended claims, and as the description proceeds in connection with the drawings wherein:

FIGURE 1 is pictorial view of the stator with one end member removed showing the usual type of insulated windings;

FIGURE 2 is an exploded pictorial view of the same stator with the windings removed and the rotor and end member axially displaced from their normal position;

FIGURE 3 is a view similar to FIGURE 1 showing the single-turn windings that have been substituted for the insulated windings;

FIGURE 4 is a side view in section of a three phase motor constructed in accordance with the principles of the present invention;

FIGURE 5 is a partial end view showing the end connections on the left end of the motor of FIGURE 4; and FIGURE 6 is a partial end view showing the end connections on the right end of the motor of FIGURE 5.

One convenient manner by which a machine may be constructed in accordance with the present invention is to remove all insulated windings and the bearings from a conventional machine. These parts are replaced with new bearings and conducting material in a form which will withstand high temperatures without destruction. The new machine is then capable of operation with internal temperatures which are limited only by the Curie limit of the magnetizable material if the melting temperature of the conducting material is higher than the Curie limit as it is for conducting materials such as silver or copper, or by the melting temperature of the conducting material if the melting temperature is lower than the Curie limit as it is for conducting materials such as aluminum.

The example illustrated in FIGURES 1 through 3 is a single phase alternating current shaded pole motor of the type commonly used in phonograph record players. In FIGURE 1, the conventional motor is shown with the rotor or armature and one end bell removed to illustrate clearly the position of coils 20. The motor casing 22, formed of magnetizable material such as iron, has four poles 24 each having an axially extending radial slot 26 which contains one side of a shorted turn 28 of conducting material such as copper forming the usual shaded pole. Each coil 20 contains approximately 300 turns of insulated wire wrapped in the usual manner with the various coils all connected in series between wires 30 and 32.

FIGURE 2 shows the same shaded pole motor with windings 20 removed. Rotor or armature 34 is of conventional construction and shown only diagrammatically. End piece 36 is different from the usual end bells, and has a bearing journal 38 of special material to permit the machine to operate at temperatures in excess of 400° or 500° F. Several materials are now available which have suitable properties for use as bearing surfaces up to temperatures of several hundred degrees F. One material suitable for operation at temperatures at least as high as the Curie limit of iron is known as Stellite, an alloy composed of tungsten (12–19%), cobalt (40–48%), chromium (30–35%) and small percentages of nickel, manganese, carbon and iron.

In this particular embodiment journal 38 of Stellite material has diametrically opposite recesses which receive tapered ends of pins 40 and 42 to permit pivotal movement of the journal about the axis of pins 40 and 42. Pins 40 and 42 are secured as by being threadedly received in ring 44 so that journal 38 can be shifted along the axis of pins 40 and 42. Ring 44 is similarly mounted between pins 46 and 48 which are also adjustably received in end member 36 whereby journal 38 can be adjusted to properly receive shaft 50 on the armature. End piece 52 on the other end of the motor is similarly constructed.

The spaces between the poles in which the windings were initially supported are of substantially square cross section and the motor casing while shown as an integral body could equally well be formed from stacked laminations in the usual manner.

Referring now to FIGURE 3, motor casing 22 of FIGURES 1 and 2 is shown with the conducting material of the stator in position in accordance with the present invention. The conducting material comprises bars 54, 55, 56 and 57 of conducting material which may be formed from electrolytic or pure annealed copper. The cross section of the copper bars is not critical and, in general, may provide approximately the same amount of copper in each opening as is present in the two legs of the coils of insulated wires as shown in FIGURE 1. Since the magnetizing force is proportional to the ampere-turns in each opening, the current density in the copper in the motors of both FIGURE 1 and FIGURE 3 will be about the same for comparable amounts of magnetizing force.

In the illustrated embodiment the conducting material comprises a rigid assembly with the ends of bars 54 and 55 connected together by a curved bar 58 of similar conducting material having approximately the same cross sectional area. Bar 58 is secured to bars 54 and 55 at one end of the motor in any manner which will withstand temperatures up to the anticipated range and provide a low resistance connection. One suitable means is silver soldering.

Another similar curved bar 60 of conducting material is connected in the same manner to the ends of conductors 55 and 56 at the opposite end of the motor and bar 62 is similarly connected between the ends of bars 56 and 57 at the one end. There is thus provided a low impedance path between the free ends of bars 54 and 57. Bars 54 and 57 or extensions thereof extend away from the motor and preferably out of any high temperature region. Because of their large cross section, there is sufficient rigidity inherently provided to prevent shorting of the bars by contact. The free ends may include suitable means for connection to the power source or transformer which for this type of machine will supply a large current at low voltage.

The motor of FIGURE 2 with the windings of FIGURE 3 operates satisfactorily in ambient temperatures in the range of 1000°–1200° F. The voltage supplied to the motor is in the range of about 0.3 to 1 volt depending on the load applied to the motor and the temperature of the motor. The motor after operation for continuous periods over more than an hour at intermittent intervals during a period of several weeks shows no sign of deterioration. An oxide coating forms on the copper bars which does not hinder operation of the machine but actually tends to prevent any current leakage through the magnetizable material.

There is very little current leakage through the magnetizable material because the voltage drop between adjacent conductors is only a fraction of a volt and the impedance through the iron is several times greater than the impedance through the intended current path formed of large copper bars. Thus the presence of insulation is actually immaterial and in the event a hot spot is formed due to an undesired high electrical admittance path through the machine, self-healing will take place by the formation of an oxide coating which will increase the admittance at the hot spot.

In machines where the copper bars make good physical contact with the iron, it may be desirable to initially provide an insulation coating of a conventional type. By the time the coating deteriorates, the oxide coating on the copper is formed as a replacement for the insulation.

Conducting materials other than copper may be used, though the use of aluminum either in the stator or rotor will reduce the upper temperature limit since aluminum loses its structural strength at temperatures in the range of about 600° to 700° F. and would not be as desirable as other conducting materials.

Electrolytic silver is preferred as a conducting material since its melting point is considerably above the Curie limit of iron which is approximately 1420° F. From tables in handbooks giving the resistivity at various temperatures for pure annealed copper and electrolytic silver, it is a well known fact that the resistance of both materials generally increases with a temperature rise and is approximately three times greater at 1200° F. than at the standard coil temperature of 220° F. The use of silver rather than copper will provide a reduction in the resistivity of the conductive material by approximately 13% at 650° F. and 9 to 10% at 1200° F.

Both motors and generators may be constructed to operate at high temperatures in accordance with this invention. Certain types of direct current machines such as a homopolar machine may conveniently take advantage of this type of construction because of an inherent low voltage, high current operating characteristic.

One of the more suitable machines for this type of construction is a three phase squirrel cage motor. A conventional motor of this type having its usual insulated windings removed and replaced by uninsulated bars of conducting material is shown in FIGURES 4, 5 and 6. Referring specifically to FIGURE 4 where a longitudinal section through the motor is shown, the magnetic material 100 is in the form of laminations which are held together by annular clamping rings 102 and 104 and several circumferentially spaced clamping rods 106. End views of the motor from opposite ends are shown in FIGURES 5 and 6.

A copper bar 110 substantially the size and shape of slots 108 is inserted axially in each slot and held in position as with a refractory material such as cement. The physical length of adjacent bars 110 of conducting material is different because of the space required for the end loops or connections 112 to 124. The cross-sectional area of the end loops is preferably substantially the same as the corresponding area of conductors 110 because the same current passes through both members. The end loops are spaced apart a small distance such as a 1/16 inch or otherwise insulated to prevent transfer of current between the end loops. This insulation may be in the form of an oxide coating and, as discussed above, may form during motor operation as a replacement for another type of insulation which deteriorates in high temperatures.

Referring now also to FIGURES 5 and 6, the end loops connect the conducting bars together in the same electrical manner that the equivalent three phase induction motor wires are connected, the difference being that only a single conductor is in each slot 108 rather than a large number of, as for example 56, turns of insulated wire. End loop 112 on one end of the machine connects the bar in slot 1 directly to the end of the bar in slot 7. The bars accordingly extend beyond the magnetic material 100 sufficiently far to allow end loops 113, 114, 115, 116 and 117 to be spaced between loop 112 and retaining ring 102.

The end loops on this end of the machine form a regular pattern with end loop 113 connecting the bar in slot 2 to the bar in slot 8, end loop 114 connecting the bars in slots 3 and 9, and so on. Another identical pattern connects the ends of bars 110 in slots 13 through 24 with only the first end loop 118 connecting the bars in slots 13 and 19 shown. The third identical pattern connects the ends of bars 110 in slot 25 through 36 with only loop 119 shown.

Each pattern requires in the particular type of winding illustrated and for a stator having 36 slots six overlapping end connections and thus an axial extension on both housing 126 and rotor shaft 128. The shape of the end connections is not critical so long as there is no interference with the assembly and operation of the motor, and except that their relative lengths should be matched so that the admittance in each phase is similar. A new importance is attached to the end loop lengths because all of the slot current goes through each rather than only a small portion of the net slot current as occurs in the multiple conductor coils.

End bell 130 is secured in the end of housing 126 as by cap screws 131 and carries the bearing which in this embodiment comprises an annular bearing backing sleeve 132 which may be of stainless steel. The bearing sleeve 134 is made of a suitable material such as Stellite or Graphitar that will operate satisfactorily in the expected temperature range.

If space considerations are important, the bearing may be supported so that it projects inwardly toward the rotor and extends under end loops 112 through 117. In installations where the high temperature will be generated internally of the motor, the bearing preferably extends externally from the motor to provide additional exposed surfaces from which heat may be radiated.

The end loops at the opposite end of the motor are connected electrically in the same manner the ordinary winding is laid out. The end loops may have the same shape and cross-sectional dimensions as the end loops at the other end of the motor. The wiring end connections however have a different amount of overlap as the bar in slot 7 is connected by end loop 120 with the bar in slot 2, the bar in slot 9 is connected by end loop 121 with the bar in slot 4, and the bar in slot 11 is connected by end loop 122 with the bar in slot 6.

The end of the bar in slot 3 is connected by loop 123 to the bar in slot 34 and the bar in slot 5 is connected by loop 124 to the bar in slot 36. This pattern of connection repeats itself two additional times for the 36 slots but only requires three separate planes for the end loop connections.

Housing 126 and shaft 128 are also extended on this end to provide the extra space required for the end loop connections 120, 121 and 122. End bell 140 is secured to housing 126 as with cap screws 142 and carries a bearing which may be of the same type shown in end bell 130.

Power is applied to the motor by means of bars 144, 146, and 148 of conducting material which extend radially through housing 126 as illustrated in FIGURES 5 and 6. These terminals are shown adjacent the slots where the three phases of power may be supplied, though it is to be recognized that different locations could be used with this type of winding and other types of known winding arrangements could equally well be used. There has, however, been found to be a net improvement in efficiency if the terminals are connected to slots which are as widely spaced as possible (i.e. 120°) because of the parasitic currents that do exist being minimized with the reduction in voltage gradient across the magnetizable material. It is to be understood that the present invention is not limited to any particular type of electrical machine, as the embodiments shown are merely illustrative of a machine as constructed in accordance with the present invention.

Rotor 150 in the particular machine being described is a squirrel cage type from a conventional one quarter horsepower motor. The magnetizable material 100 in this particular machine consists of the stampings from a one-quarter horsepower motor and the proportions of the assembled motor are accurately shown in FIGURE 4. The bars 110 of conducting material have cross-sectional dimensions of approximately ⅛ x ⅝ inch.

The torque-speed curves for squirrel cage motors of this type are well-known and the shape of the curve is in general, controlled by the rotor resistance. The torque produced by the motor is proportional to the volume of the rotor and the square of the average flux density.

In conventional machines where the normal insulation is used, the degree of magnetization of the magnetizable material is ordinarily considerably lower than the saturation point in accordance with accepted principles in good motor design. Because of the heating associated with high levels of magnetization, the thermal limitations imposed normally prevent high levels of magnetization.

However, in a machine constructed in accordance with this invention, the current density in the conducting bars can safely be increased by increasing the applied voltage to give a greater magnetizing force, thereby supplying more ampere-turns and thus increasing the flux density up to the intrinsic saturation value of the magnetizable material or even higher if desired.

The torque-speed curve of the motor is thus shifted upwardly due to the increased flux at the higher degree of saturation of the magnetizable material by an amount approximately proportional to the square of the increase in the average flux density. This largely explains why the motor illustrated in FIGURES 4-6 and constructed in accordance with the above principles is capable of producing stalled torques of approximately 40 foot pounds continuously at room temperature while a motor having the identical rotor and the same amount of magnetizable material with the usual insulated windings produces stalled torque of approximately 4 foot pounds but only for a few seconds before burning the insulation and short circuiting under the same environmental conditions.

A similar increase in the output power from this type of motor is obtained with the motor running at or near its rated speed. Thus a one-quarter horsepower motor modified as described above produces up to 10 horsepower. With this increased output per unit volume, the internal temperature increases by an amount sufficient to discolor the iron and form an oxide coating on the copper. A smaller amount of power taken from the motor will result in a smaller internal temperature increase.

It is apparent from the foregoing that a motor constructed in accordance with the principles of the present invention has a relatively low inertia to torque ratio thus making the motor particularly well adapted for uses where this characteristic is important such as in servo-mechanisms, impact devices and the like. Also the motor is especially well adapted for use where a compact motor, or one of low cost per unit power is required.

Another important use of the motor is in regions of high temperature where intermittent operation is required such as inside sealed atomic reactor chambers, either as a means for controlling positions of elements or as a pump motor for circulating the reactor coolant.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of using a dynamo-electric machine having magnetizable material and conductive material and constructed free of insulation and other materials which are destructible by temperatures up to the expected range during normal operation comprising supplying a sufficient amount of operating power at a voltage of such low magnitude as to require no insulation to said machine while loading said machine during normal operation thereof to produce an alternating electrical current in the conductive material of a magnitude sufficient to produce losses in the machine which are transformed into heat with the rate of transfer of the heat produced by said losses to the rate of heat dissipation by the machine into its surrounding environment causing internal temperatures in the machine to be at least as great as 450° F. but not exceeding whichever of the following points occurs at the lower temperature: the melting point of the conducting material and the Curie limit of the magnetizable material.

2. The process of operating a dynamo-electric machine having conducting material and magnetizable material and constructed free of insulation destructible by temperatures up to the expected range of normal operation comprising supplying during normal operation thereof an alternating voltage of such low magnitude to the conductive material as to require no insulation thereon and with sufficient current to produce a magnetization force which produces average flux densities in the magnetizable material in the region of the knee of the magnetization curve of the magnetizable material for a period of time sufficient to cause the internal temperature in the machine to attain a temperature greater than 450° F. but not exceeding whichever of the following points occurs at the lower temperature: the melting point of the conducting material and the Curie limit of the magnetizable material.

3. The process as defined in claim 2, wherein the voltage is supplied intermittently to prevent the internal temperatures in the machine from exceeding a temperature above the Curie limit of the magnetizable material.

4. A method of using a dynamo-electric machine including two parts having relative movement and which is constructed free of insulation destructible by temperatures up to the expected range of normal operation of said machine; magnetizable material formed to provide a magnetic circuit having a non-magnetic gap and electrically conducting material forming an electrical circuit between two terminals on said machine; said electrical circuit being the path between the terminals through the machine of highest admittance and being operatively associated with said magnetic circuit so that an increase in current through said electrical circuit will produce an increase in the force associated with relative movement between said two parts; said electrical circuit being formed and supported in the machine to have an admittance between said terminals which varies in a mathematically continuous manner and which changes in its real component in a manner dictated by the proportional change in conductivity of the conducting material with a change of temperature in the machine from room temperature up to the temperature where one of said materials experiences a change in a physical property essential to the operation of the machine, said method comprising supplying adequate input power to said machine during normal operation thereof to cause said machine to continue operating with an internal alternating voltage of such low magnitude as to require no insulation on the conductive material while loading the machine in an environment to such extent that internal temperatures in the machine lie between the temperature of approximately 450° F. and the temperature where one of said materials experiences a change in a physical property essential to the operation of the machine.

References Cited in the file of this patent

UNITED STATES PATENTS

| 1,617,416 | Pierce | Feb. 15, 1927 |
| 1,987,662 | Bletz | Jan. 15, 1935 |
| 2,500,802 | Clark | Mar. 14, 1950 |

FOREIGN PATENTS

| 10,655 | Great Britain | of 1912 |